(12) United States Patent
Gunda et al.

(10) Patent No.: US 11,036,435 B2
(45) Date of Patent: Jun. 15, 2021

(54) SEARCH TIME OPTIMIZATION IN SOLID-STATE DEVICES

(71) Applicant: WESTERN DIGITAL TECHNOLOGIES, INC., San Jose, CA (US)

(72) Inventors: Sridhar Prudvi Raj Gunda, Karnataka (IN); Lalit Mohan Soni, Karnataka (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 47 days.

(21) Appl. No.: 16/557,129

(22) Filed: Aug. 30, 2019

(65) Prior Publication Data
US 2021/0064280 A1 Mar. 4, 2021

(51) Int. Cl.
| | |
|---|---|
| *G06F 3/06* | (2006.01) |
| *G06F 12/02* | (2006.01) |
| *G06F 16/783* | (2019.01) |
| *G06F 16/70* | (2019.01) |

(52) U.S. Cl.
CPC ............ *G06F 3/0659* (2013.01); *G06F 3/064* (2013.01); *G06F 3/0613* (2013.01); *G06F 3/0679* (2013.01); *G06F 12/0246* (2013.01); *G06F 16/70* (2019.01); *G06F 16/783* (2019.01); *G06F 2212/7201* (2013.01)

(58) Field of Classification Search
CPC ........ G06F 12/0246; G06F 2212/7201; G06F 16/70–81

USPC ........................................................ 711/154
See application file for complete search history.

(56) References Cited

U.S. PATENT DOCUMENTS

| | | | | |
|---|---|---|---|---|
| 5,592,641 | A * | 1/1997 | Fandrich | G11C 7/24 365/185.04 |
| 6,363,470 | B1 * | 3/2002 | Laurenti | G06F 5/01 710/56 |
| 6,453,115 | B1 * | 9/2002 | Boyle | G11B 20/10 386/346 |
| 7,673,238 | B2 | 3/2010 | Girish et al. | |
| 8,599,316 | B2 | 12/2013 | Deever | |
| 9,646,227 | B2 | 5/2017 | Suri et al. | |

(Continued)

FOREIGN PATENT DOCUMENTS

EP 2407943 A1 1/2012

*Primary Examiner* — Reginald G Bragdon
*Assistant Examiner* — Aaron D Ho
(74) *Attorney, Agent, or Firm* — Arent Fox LLP (57) ABSTRACT

Aspects of a storage device include a memory comprising a plurality of memory locations each associated with a physical address, the memory configured to store a plurality of video frames received from a host device at the physical addresses, each of the video frames being associated with a logical address; and a controller configured to store in a partition of the memory the logical addresses for a subset of the video frames, the controller being configured to provide the host access to the partition to read the logical addresses during rapid playback of the video frames. Aspects of the host device include a processor configured to write the video frames to the storage device, to identify the subset of the video frames to the storage device, and during rapid playback, to access the storage device to read the logical address for each video frame in the subset.

19 Claims, 5 Drawing Sheets

(56) References Cited

U.S. PATENT DOCUMENTS

| | | | |
|---|---|---|---|
| 2002/0131765 A1* | 9/2002 | DeKeyser | H04N 5/9261 |
| | | | 386/327 |
| 2005/0237330 A1* | 10/2005 | Stauffer | G09G 5/363 |
| | | | 345/531 |
| 2006/0222337 A1 | 10/2006 | Fujikawa et al. | |
| 2006/0274828 A1 | 12/2006 | Siemens et al. | |
| 2011/0013882 A1* | 1/2011 | Kusunoki | G11B 27/28 |
| | | | 386/241 |
| 2014/0105581 A1* | 4/2014 | Makabe | G11B 27/031 |
| | | | 386/288 |

* cited by examiner

SEARCH TIME OPTIMIZATION IN SOLID-STATE DEVICES

BACKGROUND

Field

This disclosure is generally related to electronic devices and more particularly to storage devices.

Background

Storage devices enable users to store and retrieve data. Examples of storage devices include volatile memory devices and non-volatile memory devices. A non-volatile memory generally retains data after a power cycle, while a volatile memory generally loses data after a power cycle. An example of a non-volatile memory is a flash memory, which may include array(s) of NAND cells. Flash memory may be found in solid-state devices (SSDs), Secure Digital (SD) cards, and the like.

A flash storage device may store control information associated with data. For example, a flash storage device may maintain control tables that include a mapping of logical addresses to physical addresses. These control tables are used to track the physical location of logical sectors, or blocks, in the flash memory. The control tables are stored in the non-volatile memory to enable access to the stored data after a power cycle.

Closed circuit television (CCTV) footage may be written to the non-volatile memory of a flash storage device as data for future playback. The footage may be used, for example, when searching for the time and day of an unknown traffic incident or warehouse object movement, detecting a time of theft or other criminal activity, or other scenarios. The amount of footage that can be stored on the storage device (e.g. the total duration of the video frames) may be based on various factors including the capacity of the storage device and the video format. However, as the duration of the footage increases, the search time involved in replaying back the footage also increases, lengthening the time taken to identify the exact date and time of an unknown incident and increasing the possibility that otherwise relevant events, such as subtle actions of a background party, are missed.

SUMMARY

One aspect of a storage device is disclosed herein. The storage device includes a memory configured to store a plurality of video frames received from a host, where each of the video frames is associated with a logical address. The storage device also includes a controller configured to store in a partition of the memory the logical addresses for a subset of the video frames. The controller is further configured to provide the host with access to the partition of the memory to read one or more of the logical addresses stored in the partition during rapid playback of the plurality of video frames.

Another aspect of a storage device is disclosed herein. The storage device includes a memory comprising a plurality of memory locations each associated with a physical address. The memory is further configured to store each of a plurality of video frames received from a host at one of the physical addresses of the memory. The storage device also includes a controller configured to map in a portion of the memory the physical address for each of the video frames with a logical address. The controller is further configured to store the logical addresses for a subset of the video frames in a partition of the memory separate from the portion of the memory.

One aspect of a host device is disclosed herein. The host device includes a processor configured to write a plurality of video frames to a storage device, where each of the video frames is associated with a logical address. The processor is further configured to identify a subset of the video frames to the storage device, and during rapid playback of the plurality of video frames, access the storage device to read the logical address for each of one or more of the video frames in the subset.

It is understood that other aspects of the storage device and host device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure. Moreover, references to CCTV as used throughout this disclosure are exemplary in nature. For example, the video frames stored on and retrieved from the storage device are not limited to video frames captured specifically from video surveillance or security devices, but can be video frames captured from any camera, monitor, or other device used in any application.

Typically, CCTV footage is captured and written to a storage device (such as a SSD) in an encoded video format using host write commands. As a result, storage devices can store one or more months, or even years, of continuous footage. If the date and time of an incident (e.g. a traffic accident, a theft of an object from a warehouse, etc.) captured by a CCTV camera needs to be identified from one month's worth of footage, the amount of time to search through all the video frames may significantly range from one month (e.g. at 1× playback speed) to approximately a day (e.g. at 32× playback speed).

To effectively improve this search time of the video frames, the present disclosure allows the storage device to store the logical addresses (for example, the logical block addresses or LBAs) of a subset of the video frames in a separate or dedicated partition allocated for these logical addresses. The host may identify the subset of video frames by reading from the partition the logical addresses associated with each video frame in the subset. Afterwards, the host may read the actual video frames in the subset from the stored video frames in the storage device using the previously read logical addresses. By providing a separate partition for storing the logical addresses for the subset of video frames, the host may continue to read from and write video frames to the remaining memory of the storage device in usual operation, without affecting the logical addresses in the partition. Meanwhile CCTV operations for storage of present and future events can resume undisturbed, e.g., using memory locations different from the populated locations being searched.

The subset of video frames may include only those video frames which are considered main frames or impacted frames of a plurality of video frames. As used herein, a main frame is a video frame which includes a complete image (e.g. every pixel of a video frame), in contrast to a sub-frame which includes only a portion of the pixels of a main frame. Main frames may be captured whenever a change (for example, motion of an object) has occurred. For instance, in a warehouse environment, a main frame may indicate a box being moved relative to a previous frame, while in a traffic environment, a main frame may indicate a car moving relative to a previous frame. Also as used herein, an impacted frame is a main frame which is identified as corresponding to an incident. For example, an impacted frame may indicate a vehicle moving through a red light, a traffic accident, a vehicle not moving during a green light, a vehicle moving beyond the speed limit, a vehicle failing to follow traffic rules, an object hindering a vehicle from moving, a major smoke incident, etc. Impacted frames may be identified from main frames using, e.g. artificial intelligence (AI) and application-specific features (e.g. sensors, traffic rules, etc.). Depending on the application (e.g. warehouse versus traffic signals, etc.), either main frames or impacted main frames may be included in the subset of video frames.

Thus, the present disclosure allows searching time to be drastically reduced by allowing the host to perform rapid playback of the subset of video frames (e.g. main frames or impacted frames depending on the application) in order to search for an incident, in contrast to the conventional burden of playing back the entire footage. As used herein, the term "rapid playback" is an operation comprising the reading of the subset of video frames, as opposed to reading of the entire plurality of video frames at 1×, 2×, 4×, 8×, 16×, 32× playback speed, etc. Significant time can be saved by rapid playback; for example, assuming one year of video frames is captured in a storage device and one impacted frame is observed in every 5 minute interval, the present disclosure may allow for rapid playback of the impacted frames within a minimum of only 1.21 days, in contrast to the 11.4 days required for 32× playback speed of the entire footage.

Figure 1:
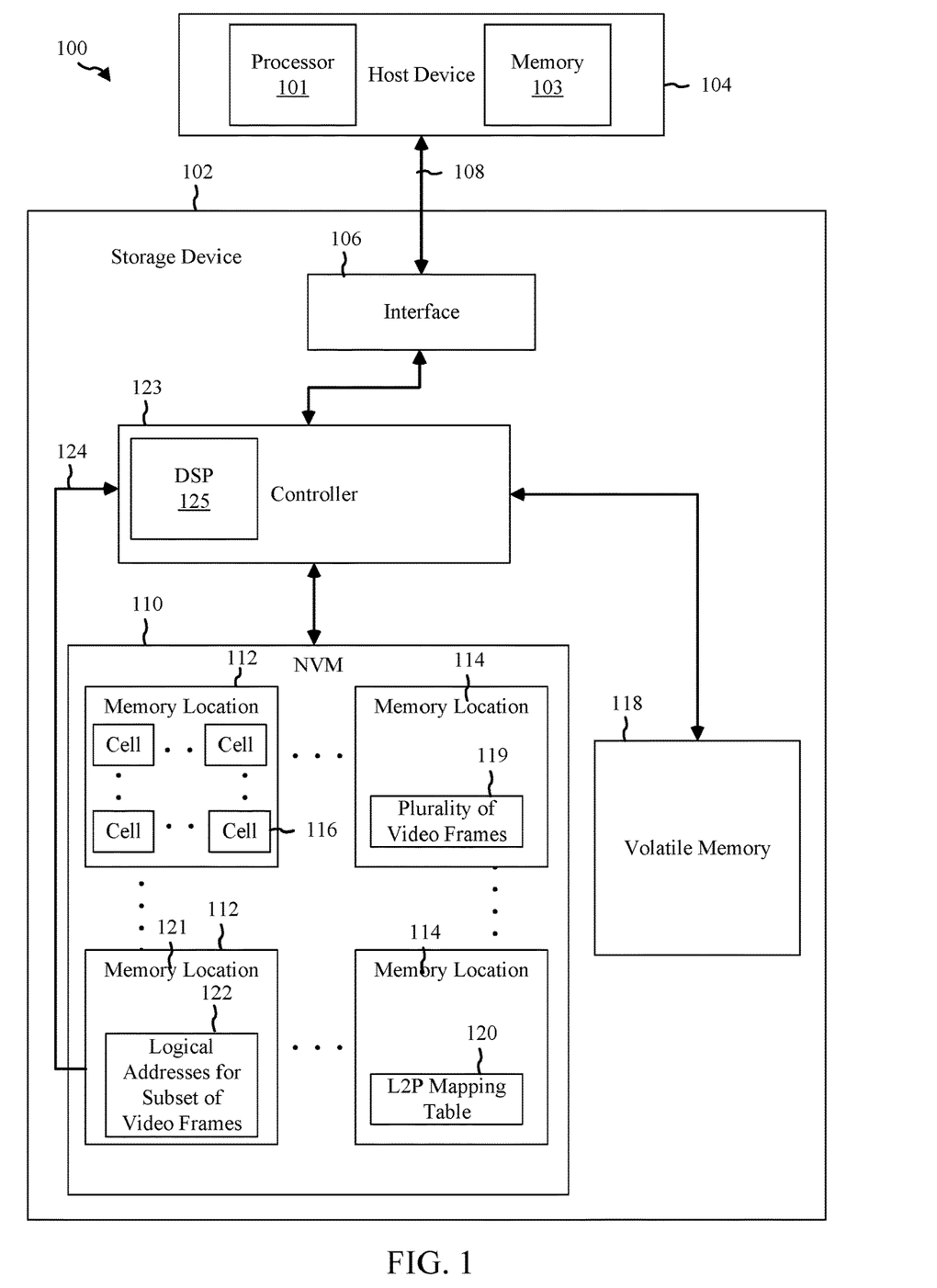
FIG. 1 is a block diagram illustrating an exemplary embodiment of a storage device in communication with a host device.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host (s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

As shown in the exemplary embodiment of FIG. 1, the storage device 102 includes non-volatile memory (NVM) 110 for non-volatilely storing data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the illustrated exemplary embodiment of FIG. 1, each memory location 112 may be a block 114 including multiple cells 116. Other examples are possible; for instance, each memory location may include multiple blocks, and each block may include SLCs, MLCs, TLCs, and/or QLCs. Moreover, each memory location may include one or more blocks in a 3-D NAND array. Alternatively, each memory location 112 may not be a block, but may instead be one or more cells 116 or one or more pages of cells. Any size of memory location 112 (e.g. cell(s), page(s), block(s), etc.) may be configured. Moreover, the illustrated memory locations 112 may be logical blocks, pages or cells which are mapped to one or more physical blocks, pages, or cells.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer and a read buffer for temporarily storing data.

The memory (e.g. NVM 110) is configured to store a plurality of video frames 119 received from the host device 104. The plurality of video frames 119 include the continuous CCTV footage received from the host device, and as described above, may have a duration of one month, one year, or any other number. As an example, FIG. 1 illustrates a plurality of video frames 119 being stored in one of the memory locations 112, although the plurality of video frames 119 can be stored in multiple memory locations 112.

Each of the plurality of video frames 119 that includes the CCTV footage may be associated with a logical address. For example, the NVM 110 may store a logical-to-physical (L2P) mapping table 120 for the storage device 102 associating each video frame with a logical address. The L2P mapping table 120 stores the mapping of logical addresses specified for data written from the host 104 (e.g. individual video frames of the plurality of video frames 119) to physical addresses in the NVM 110 indicating the location(s) where each of the video frames are stored. This mapping may be performed by a controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
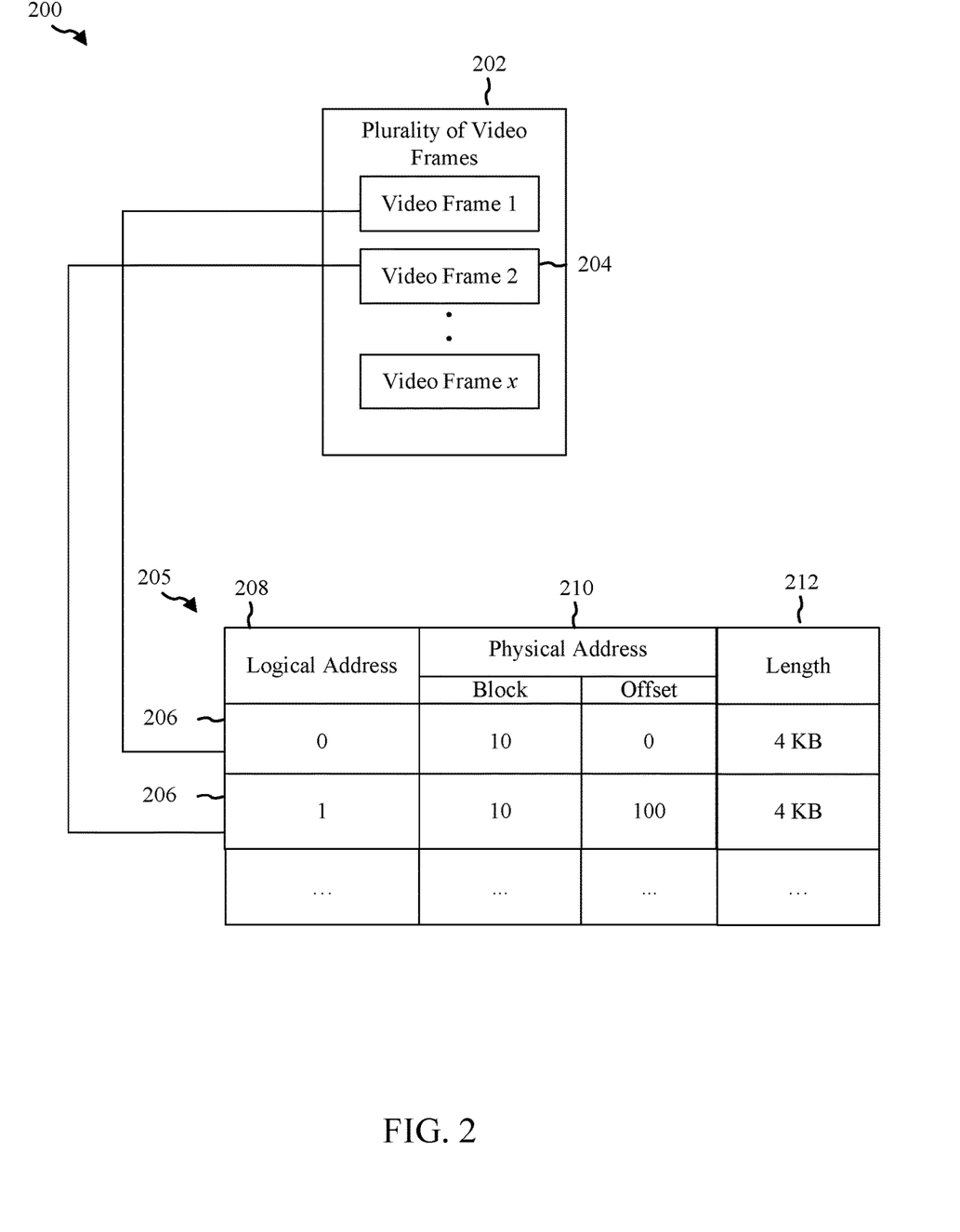
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of a plurality of video frames 202 received from a host device to logical addresses and physical addresses in the NVM 110 of FIG. 1. The plurality of video frames 202 may correspond to the plurality of video frames 119 in FIG. 1, while L2P mapping table 205 may correspond to L2P mapping table 120 in FIG. 1. In one exemplary embodiment, the plurality of video frames 202 may include video frames 1 to x, where x is the total number of continuous video frames being written to the storage device 102. Each video frame 204 may be mapped to an entry 206 of the L2P mapping table 205 identifying a logical block address (LBA) 208, a physical address 210 associated with each video frame written to the NVM, and a length 212 of the video frame. LBA 208 may be a logical address specified in a write command for the video frame received from the host device. Physical address 210 may indicate the block and the offset at which the video frame associated with LBA 208 is physically written. Length 212 may indicate a size of the written video frame (e.g. 4 KB or some other size).

Referring back to FIG. 1, the host device 104 stores data in storage device 102 by sending a write command to the storage device 102 specifying one or more logical addresses (e.g., LBAs) associated with the data (e.g. each video frame in the plurality of video frames 119), as well as a length of the data to be written. The interface element 106 receives the write command and the controller 123 allocates a memory location 112 in the NVM 110 of storage device 102 for storing the data. The controller 123 stores the L2P mapping in the NVM to map a logical address associated with the received data to the physical address of the memory location 112 allocated for the data. The controller also stores the length of the L2P mapped data. The controller 123 stores the data in the memory location 112.

The host 104 may retrieve data (e.g. each video frame in the plurality of video frames 119) from the storage device 102 by sending a read command specifying one or more logical addresses associated with the data to be retrieved from storage device 102, as well as a length of the data to be read. The interface 106 receives the read command, and the controller 123 accesses the L2P mapping in the NVM to translate the logical addresses specified in the read command to the physical addresses indicating the location of the data. The controller 123 then reads the requested data of the specified length from the memory location 112 specified by the physical addresses, and returns the read data to host 104 via host interface 126.

While the host 104 may retrieve data at different playback speeds (e.g. read every second video frame for 2× playback, read every fourth video frame for 4× playback, etc.), the amount of time to search through the entire plurality of video frames 119 for an incident may be significant. Accordingly, to improve search efficiency and time, the memory (e.g. NVM 110 and/or volatile memory 118) may be configured to store logical addresses for a subset of video frames 122 of the plurality of video frames 119. The subset of video frames may be, for example, main frames or impacted frames that are identified by the host device using the processor 101 (e.g. using AI) or by the storage device using a digital signal processor or DSP chip in the controller 123. The logical addresses for the subset of video frames 122 may include, for example, LBAs or other logical addresses associated with each memory location 112 in which the corresponding video frame (of the plurality of video frames 119) is stored. These logical addresses may thus be a subset of the full set of logical addresses in the L2P mapping table 120.

The logical addresses for the subset of video frames 122 may be stored in a partition 121 of the memory separate from other data. To prevent accidental overwrites of these logical addresses from the host device 104, the partition 121 can be configured (e.g. by the controller 123) to be read-only 124 for the host. As an example, FIG. 1 shows the logical addresses for the subset of video frames 122 being stored in a read-only partition 121 separate from the plurality of video frames 119 and the L2P mapping table 120. The partition 121 may include one or more blocks 114 or one or more pages of cells 116.

Figure 3:
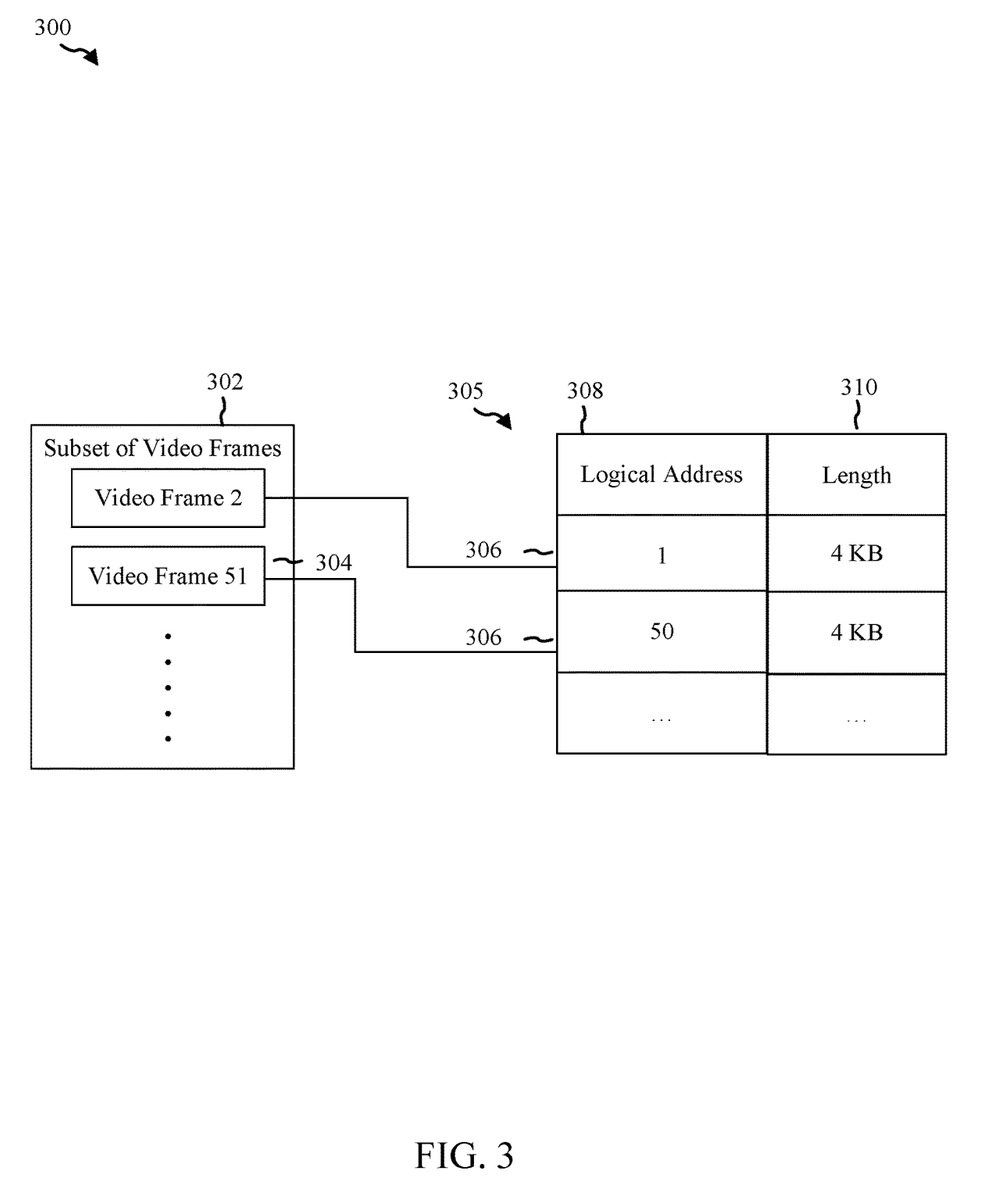
FIG. 3 is a conceptual diagram illustrating an example of a table for storing logical addresses of a subset of video frames in a non-volatile memory of the storage device of FIG. 1.

FIG. 3 is a conceptual diagram 300 of an example of a logical address table 305 for a subset of video frames 302 stored in a partition of the NVM 110 of FIG. 1. The subset of video frames 302 may correspond to the subset of video frames 122 in FIG. 1, while the logical address table 305 may correspond to the logical addresses for the subset of video frames 122 in FIG. 1. In one exemplary embodiment, the subset of video frames 302 may include those video frames which were identified as main frames or impacted frames. For example, FIG. 3 illustrates that video frames 2 and 51 (among others) were identified as main frames from the plurality of video frames 119, 202 in FIGS. 1 and 2; e.g. video frames 2 and 51 were detected to possess one or more identified criteria for flagging the frames. For instance, video frames 2, 51, and potentially others were identified to depict movement relative to a previous frame, or to depict an incident such as a collision. It will be appreciated that other criteria may be discerned as relevant in connection with a given application, in which case the controller 123 (FIG. 1) may program the criteria accordingly for flagging the frames.

Referring back to the present example and FIG. 3, each video frame 304 in the subset of video frames 302 may be mapped to an entry 306 of the logical address table 305 identifying a logical address 308 associated with each video frame written to the NVM, and a length 310 of the video frame. The logical address 308 may be the LBA 208 (or other logical address) in which the original video frame received from the host device is stored in the storage device. The length 310 may be the length 212 of the video frame stored in the storage device (e.g. 4 KB or some other size).

In operation, the storage device may allocate and provide the host device the logical address of the partition in which the logical address table 305 is stored during initialization of the storage device. Alternatively, the logical address of the partition may be preconfigured or selected by the host device. When performing rapid playback, the host device sends a read command with the logical address of the partition to the storage device, in response to which the storage device provides the host device the logical addresses 308 and lengths 310 of the subset of video frames 302. Once the host device reads the logical addresses 308 and lengths 310, the host device sends read commands for each video frame in the plurality of video frames 202 associated with the corresponding logical addresses 208 based on the L2P mapping table 205 in FIG. 2. For example, if the host device obtains the first entry 306, i.e. logical address 1, and sends a read command for the first entry 306, the storage device identifies the corresponding entry 206 for logical address 1 in the L2P mapping table 205, accesses the video frame of length 212 from the associated physical address 210 in the memory, and provides the video frame 204 to the host device. The process may repeat for every video frame in the subset of video frames. In this way, the host device may perform rapid playback since the host reads only the video frames associated with main frames or impacted frames from the storage device as opposed to every frame, every other frame, every four frames, or every other specified number of frames. While FIG. 3 illustrates logical addresses and lengths being stored in a logical address table 305, the logical addresses and lengths may be stored in any other data structure.

Referring back to FIG. 1, the storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof. The controller 123 may be configured to store in a partition 121 of the memory (e.g. NVM 110) logical addresses and lengths for a subset of video frames 122 received from the host device 104. The controller 123 may be further configured to provide the host device 104 with access to the partition 121 of the memory to read one or more of the logical addresses stored in the partition during rapid playback of the plurality of video frames 119. For example, the controller 123 may allow the host device to read the logical addresses for the subset of video frames 122 from the partition 121, and then read the corresponding video frames associated with those logical addresses from the plurality of video frames 119 based on the L2P mapping table 120. The controller 123 may also be configured to map, in a portion of the memory, the physical address for each of the video frames with a logical address. For example, the controller 123 may configure the L2P mapping table 120 in one or more of the memory locations 112 of NVM 110. The controller 123 may also be configured to store the logical addresses and lengths for a subset of the video frames in a partition of the memory separate from the portion of the memory. For instance, the controller 123 may allocate the partition 121 to be separate from the locations of the plurality of video frames 119 and L2P mapping table 120, as illustrated, e.g., in FIG. 1. If one or more of the plurality of video frames 119 needs to be erased or overwritten (e.g. the NVM 110 becomes full, the footage becomes outdated, etc.), the controller 123 may further be configured to erase one or more logical addresses (and lengths) for the one or more video frames in the subset of video frames 302. For example, the controller 123 may remove or overwrite the entries in the logical address table 305 corresponding to any logical addresses removed or overwritten in the L2P mapping table 205.

On the host side, the processor 101 of host device 104 may be configured to write the plurality of video frames to the storage device 102. For example, the processor 101 may send one or more write commands to the controller 123 in the storage device 102 to write the plurality of video frames 119 to one or more of the memory locations 112 of the storage device, and to update the L2P mapping table 120 with the logical addresses and lengths associated with each video frame. The processor 101 may also be configured to identify a subset of the video frames to the storage device 102, and during rapid playback of the plurality of video frames 119, access the storage device 102 to read the logical address and length of each of the one or more video frames in the subset of video frames. For example, the processor 101 may identify one or more main frames or impacted frames from the plurality of video frames 119 and flag those particular frames to the storage device (e.g. using a bit or other information) when writing each video frame 119 to the storage device 102. The controller 123 may then identify each video frame as belonging to the subset of video frames 122 (e.g. based on the bit or other information of each video frame 119), and write those logical addresses separately in the partition 121 along with the length of each video frame. The processor may then access the storage device (e.g. partition 121) to read the logical address and length of each video frame in the subset of video frames 122 during rapid playback. For example, the processor 101 may send a read command to the controller 123 to read the logical addresses from the partition 121, then after receiving the logical addresses corresponding to the subset of video frames 122, send one or more additional read commands to the controller 123 to read the corresponding video frames of the plurality of video frames 119 associated with those logical addresses.

The processor 101 of the host device 104 may identify each frame in the subset of video frames to be a main frame in various ways. In one example, the processor 101 may identify a video frame as a main frame based on a comparison of that video frame with a previous video frame. For example, in a warehouse environment, the processor 101 may determine that a current frame indicates movement of a box or other object relative to a previous frame, and therefore may flag that current frame as a main frame. In this example, as the processor 101 writes each video frame of the plurality of video frames 119 to the storage device 102, the processor 101 may store the previously written video frame and current video frame in the memory 103 of the host device 104. If the processor 101 determines that the previous frame and the current frame are different, the processor may flag the current video frame as a main frame to the storage device 102. Otherwise, the processor 101 may replace the previous frame with the current frame for the next iteration, or may leave the previous frame as-is for comparison in the next iteration.

In a further example, the processor 101 may identify the video frame as a main frame (e.g. an impacted frame in this example) using AI and based on application-specific features. For example, in the traffic environment, the host device 104 may implement AI (e.g. in the processor 101 or in a server which is local or remote to the host device 104) to identify suspicious or fatal incidents in the plurality of video frames 119, or other relevant occurrences. The processor 101 may also identify the impacted frames displaying these incidents based on one or more application-specific features such as sensors in communication with the host device 104, speed limits and traffic rules known to or accessible by the host device 104, and other features specific to the traffic environment. Thus, if a vehicle passes through a red light, the processor 101 may identify the impacted frame in which this incident happens based on a detection of vehicle movement relative to prior frames, detection of the red light, and other elements. The processor 101 may then flag this impacted frame for the subset of video frames 122 when writing the video frame to the storage device 102.

While the processor 101 may identify the subset of frames according to the examples described above, the examples are not so limited; the subset of frames may be identified in other ways and in other applications (for example, with or without AI and using other application-specific features besides traffic). Moreover, while the aforementioned examples describe the host device 104 and/or processor 101 as identifying the subset of video frames, the storage device and/or controller 123 may alternatively (or additionally) identify the subset of video frames. For example, the controller 123 may include a DSP 125 (for instance, a DSP chip) which is configured to identify the subset of the video frames 122 to be stored in the partition 121, in particular, by identifying main frames of the subset of video frames based on information received from the host device 104. In one example, the information may be a previous frame received from the host device, and the controller 123 may identify the video frame as a main frame based on a comparison of the video frame with the previous frame as described above for processor 101. In a further example, the controller 123 may identify main frames using AI (e.g. in the DSP 125) and based on application-specific features, as described above for processor 101. The controller 123 may identify the subset of video frames in other ways and in other applications as well.

The controller 123 and processor 101 may be implemented with embedded software that performs the various functions of the controller and processor described throughout this disclosure. Alternatively, software for implementing each of the aforementioned functions may be stored in the NVM 110 or in a memory external to the storage device 102 or host device 104, and may be accessed by the processor 101 for execution at the host device, or by the controller 123 for execution by the one or more processors of the controller 123. Alternatively, the functions of the processor or controller may be implemented with hardware in the processor 101 or controller 123, or may be implemented using a combination of the aforementioned hardware and software.

Thus, rapid playback may be achieved using the principles of the present disclosure based on identification of a subset of video frames at the host device 104, or in some embodiments at the storage device 102, and based on storage of the logical addresses for the identified subset of video frames for subsequent read access. For example, the processor 101 of the host device (or in some embodiments, the controller 123 of the storage device) may be programmed to run a concurrent predefined analysis on the video frames being stored in the storage device 104, which may not only disqualify a large number of irrelevant video frames during a subsequent search by the host, but may also identify a much smaller number of highly pertinent frames. For instance, in one example application, main frames in an enhanced form with potentially highlighted graphics and greater detail may be identified which provide the searcher with invaluable information regarding an incident or occurrence, while sub frames that are of smaller size and resolution may not be deemed to include features worthy of flagging by the processor 101 or controller 123. Furthermore, once these pertinent frames are found, the host device may be free to conduct a further search in the temporal vicinity of the frames of interest, for example, of other video frames adjacent in time to the pertinent frames (e.g. to identify how the incident happened or other context). The capabilities of recording devices such as CCTV and other monitoring systems may in this way be significantly enhanced by the principles of this disclosure.

As described above, the host device may individually read main frames (e.g. impacted frames) in the subset of video frames during rapid playback, where each impacted frame may be associated with a date and time corresponding to an incident. However, to identify context for that date and time (e.g. information leading up to the incident), the host device may need to read other video frames before the identified impacted frame. For example, as illustrated in FIG. 2, if the host device only reads the video frame 2 associated with logical address 1 in the L2P mapping table 205 (since that video frame was in the subset of video frames 302), the host device may need to read one or more prior video frames for context (for example, the video frame 1 associated with logical address 0).

Thus, in one embodiment of the present disclosure, the volatile memory 118 is configured to store the logical addresses and lengths of one or more of the plurality of video frames that occurred prior to one or more video frames in the subset of video frames 122. Identified main frames are first stored in the volatile memory 118 as they are received. When a video frame of the subset of the video frames is identified (e.g. an impacted main frame is determined), the controller 123 may move the logical addresses and lengths stored in the volatile memory to the partition 121, where they are added to the subset of video frames 122. In one example, the logical addresses and lengths may be stored in a circular buffer in the volatile memory.

Figure 4:
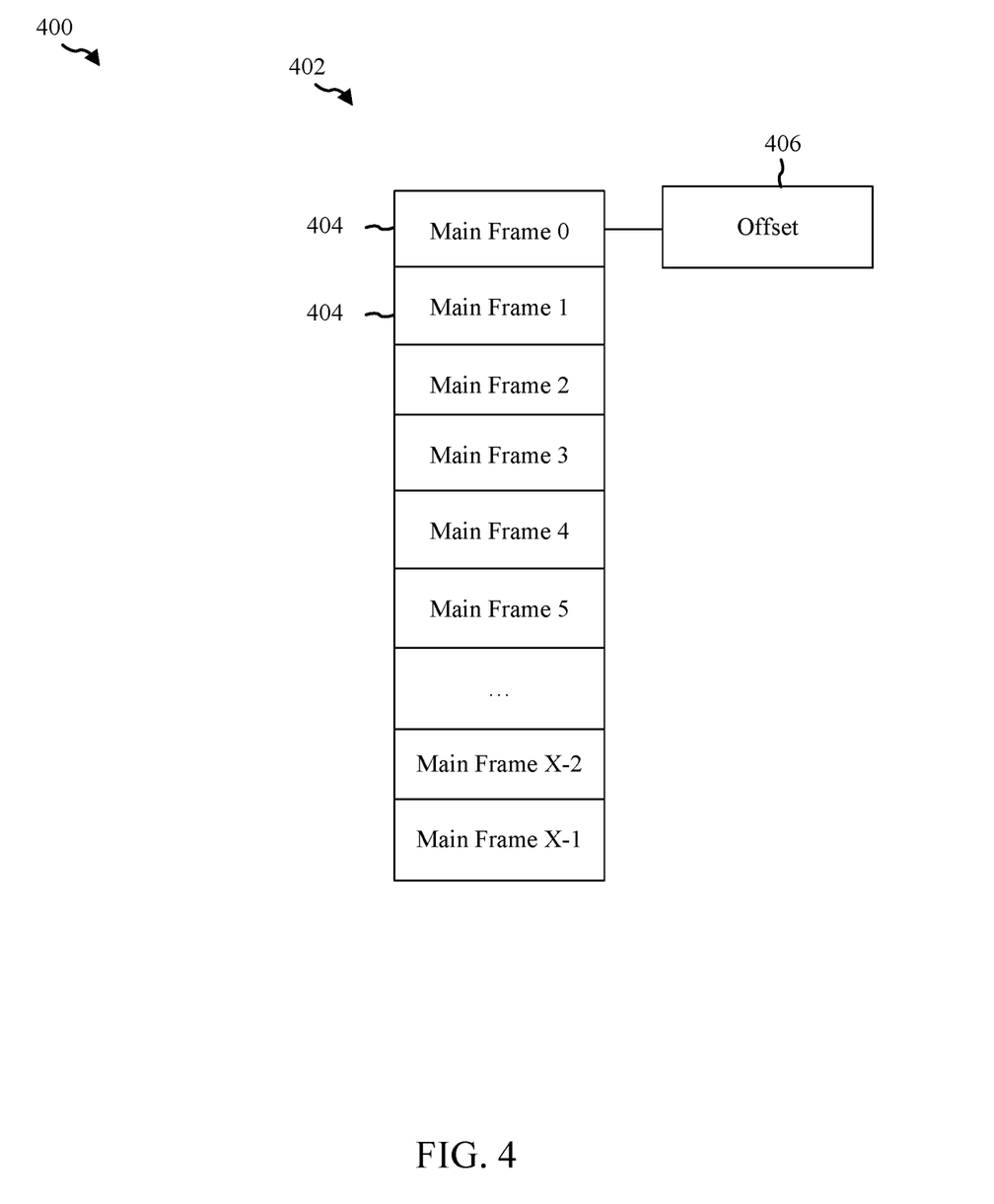
FIG. 4 is a conceptual diagram illustrating an example of a circular buffer for storing main frames of the subset of video frames in a volatile memory of the storage device of FIG. 1.

FIG. 4 illustrates an example diagram 400 of an exemplary circular buffer 402 in volatile memory for storing logical addresses and lengths of a number of video frames 404 being written to the NVM of the storage device. For example, the circular buffer 402 may be implemented in volatile memory 118 of FIG. 1, and the video frames 404 may correspond to video frames of the plurality of video frames 119 being individually written to the NVM 110. In the example of FIG. 4, the circular buffer 402 has a size of X main frames (0 to X−1), where the size may be preconfigured or dynamically configured by the storage device based on an amount of available space in the volatile memory and NVM. In this embodiment, when main frames are identified as described above, the logical addresses and lengths for those main frames 404 may be stored in the circular buffer 402 prior to being added to the subset of video frames in the NVM. The main frames remain in the volatile memory until an impacted frame is identified as described above. Once an impacted frame is identified, all the logical addresses and lengths of the main frames currently stored in the circular buffer 402 including the impacted frame are moved from the volatile memory to the NVM, where they are added to the subset of video frames.

For instance, in the traffic environment, when vehicle movement is detected in a video frame relative to a previous frame, but before an incident happens (i.e. the video frame is a main frame but not an impacted frame), the identified main frame may be stored in the first available location of the circular buffer 402 (i.e. Main Frame 0). When another main frame is identified, it is stored in the next available location (i.e. Main Frame 1), and so forth. In this example, four main frames (0-3) have been identified and stored in the volatile memory at Main Frames 0, 1, 2, and 3 in FIG. 4. Once an incident happens and is identified (i.e. the main frame is an impacted frame), this video frame is also stored in the circular buffer 402 at the next available location (i.e. in this case, Main Frame 4). Afterwards, all of the stored main frames (i.e. Main Frames 0-4) are moved from the volatile memory to the partition and added to the subset of video frames in the NVM. The host device may then read the logical addresses and lengths of the subset of video frames as described above when performing rapid playback, including prior Main Frames 0-3 as well as Main Frame 4.

In one embodiment, an offset 406 for the impacted video frame in the circular buffer is also stored in the partition. The offset serves as a reference point allowing the host device to identify the earliest video frame in the circular buffer (e.g. the first of the logical addresses stored prior to the impacted frame). For instance, in the traffic example above with Main Frames 0-4, the controller may determine the offset 406 to be 0, since Main Frame 0 was the earliest video frame stored in the circular buffer. If an impacted frame is identified before the circular buffer is full as in the above example, the offset 406 is always 0. However, once the circular buffer becomes full (e.g. Main Frame X−1 in FIG. 4 was stored without an impacted frame being identified), the earlier Main Frames are overwritten and the offset increments every time a new main frame is stored. For example, after Main Frame X−1 is stored, if a new main frame is identified, it'll be stored as the new Main Frame 0 (overwriting the prior Main Frame 0), and since Main Frame 1 will now be the earliest main frame in the buffer, the offset increases to 1. Similarly, if another main frame is identified, it'll be stored as the new Main Frame 1, and the offset will increase to 2. The offset may continue to increment as main frames are identified until the impacted frame is identified. If the circular buffer 402 is fully overwritten again, the offset will reset to 0. Thus, assuming in this example that an impacted frame is the next frame identified (e.g. new Main Frame 2 in this example), the offset will be incremented to 3 and all X−1 main frames will be moved to the partition of the NVM as before, along with the offset 406 of 3. Using this offset, the controller 123 may determine that Main Frame 3 is the earliest frame from the circular buffer (not Main Frame 0 as before), and therefore may add all X−1 main frames to the subset of video frames beginning from Main Frame 3. As a result, the subset of video frames may continue to be arranged in chronological time order.

Figure 5:
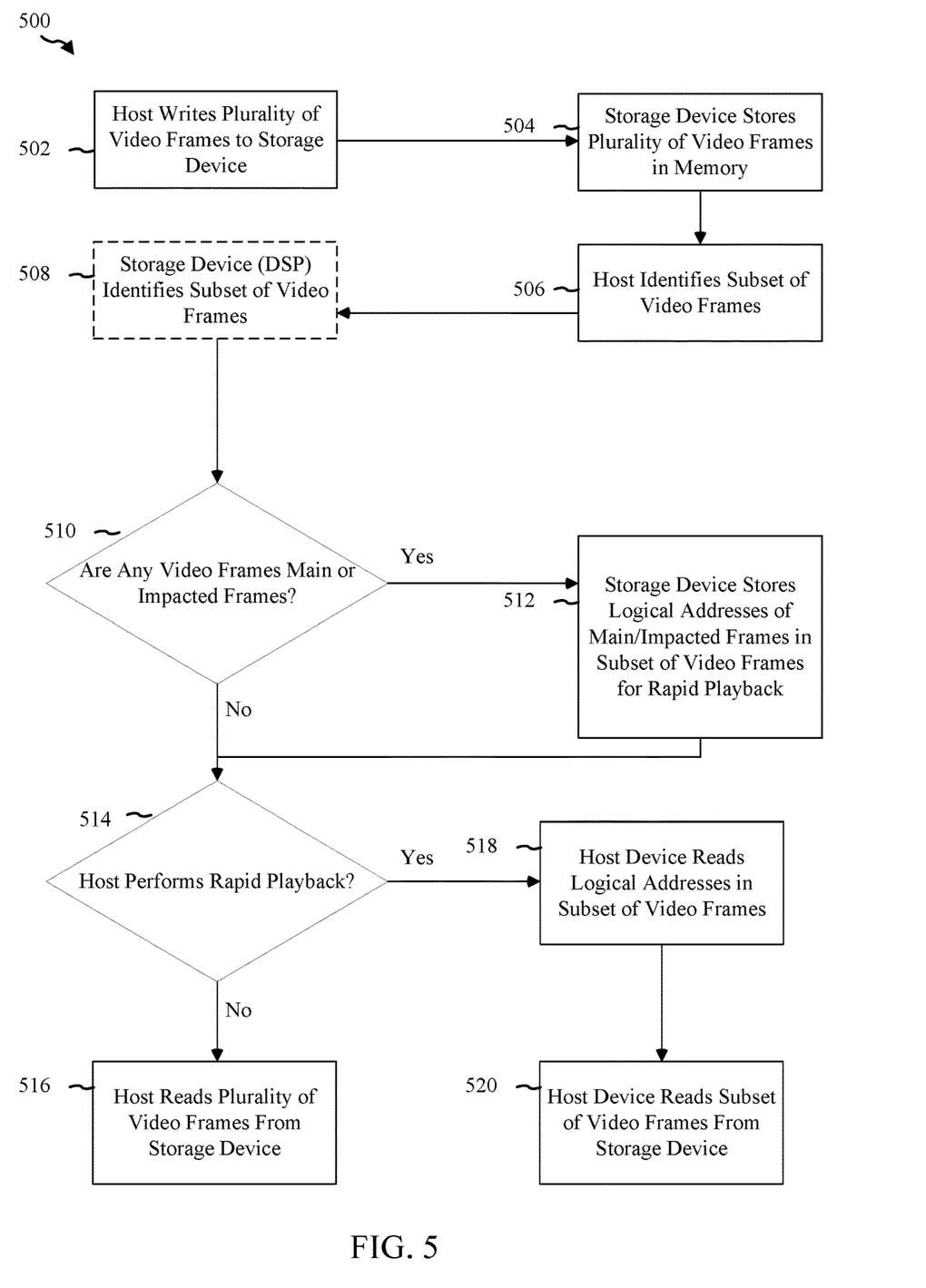
FIG. 5 is a flow chart illustrating an exemplary method for reading and writing video frames on a storage device supporting rapid playback.

FIG. 5 illustrates a flow diagram 500 illustrating an example of communication flow between a host device (e.g. the host device 104 of FIG. 1) and a storage device (e.g. the storage device 102 of FIG. 1) to perform rapid playback of a subset of video frames on the storage device. At block 502, the host writes a plurality of video frames to the storage device. For example, referring to FIG. 1, the processor 101 of the host device 104 may send write commands including the logical addresses and lengths of a plurality of video frames 119 to the controller 123 of the storage device 102.

At block 504, the storage device stores the plurality of video frames in memory. For example, referring to FIGS. 1 and 2, the controller 123 stores the plurality of video frames 119 in one or more memory locations 112 in the NVM 110 (e.g. in one or more cells, pages or blocks) associated with a physical address, and updates the L2P mapping table 120, 205 with the logical addresses associated with each physical address of each video frame as well as the length of each video frame.

At block 506, the host identifies a subset of video frames. For example, referring to FIG. 1, the processor 101 of the host device 104 identifies whether any of the plurality of video frames 119 are main frames or impacted frames depending on the application. For instance, in a warehouse environment, the processor 101 may identify whether a video frame in the plurality of video frames 119 includes movement of an object relative to previous video frame, while in the traffic environment, the processor 101 may identify whether a video frame in the plurality of video frames 119 displays an incident (e.g. a traffic accident, a red light crossing, etc.). In any environment, the processor 101 may identify a video frame as a main frame or impacted main frame based on, for example, a comparison between the video frame and a prior video frame, and/or AI and application specific features (e.g. sensors, traffic rules, etc.).

Optionally, at block 508, the storage device may identify the subset of video frames (alternatively or additionally to the host device in block 506). For example, referring to FIG. 1, the controller 123 of the storage device 102 may include a DSP 125 which identifies whether any of the plurality of video frames 119 are main frames or impacted frames using AI depending on the application. The identification may be the same as performed by the processor 101 described above, except the application may be more limited for the storage device as opposed to the host device. For example, the DSP 125 may not be able to identify impacted frames in a traffic environment where application-specific features such as numerous sensors may be needed which add complexity in identification.

At block 510, the storage device determines whether any of the video frames in the plurality of video frames 119 are main frames or impacted frames. For example, when the host device identifies a main frame or impacted frame at block 506, the host device may flag that video frame when writing the video frames to the storage device at block 502, for example, using a bit or other information. For instance, referring to FIG. 1, the host device 104 may flag a video frame in the plurality of video frames 119 with a bit value of '1' if it is a main frame or impacted frame, and '0' otherwise. The storage device 102 may determine whether the video frame falls within the subset of video frames based on this bit. Alternatively, the host device 104 may transmit other information in the write command for each video frame, such as, for example, a previous video frame for comparison, and the storage device 102 may determine whether the video frame falls within the subset of video frames based on this information. For instance, the controller 123 may include a DSP 125 which identifies the subset of video frames as described at block 508.

If any of the video frames in the plurality of video frames 119 are main frames or impacted frames, at block 512, the storage device stores the logical addresses and lengths of these frames in the subset of video frames for use in rapid playback. For instance, referring to FIGS. 1 and 3, the storage device 102 may store the logical address and length of the main frame received in a write command from the host device 104 in the logical address table 305 in the partition 121 of the NVM 110. In one embodiment, the logical address and length may immediately be added to the subset of video frames 302 as each video frame 119 is received and stored in the NVM 110.

In another embodiment, the logical address and length may first be stored in the volatile memory 118, for example, in a circular buffer 402 of a predetermined size. As main frames are identified (by the host or storage device), the logical addresses and lengths for the main frames are continuously stored in the circular buffer until an impacted main frame is identified. An offset in the circular buffer remains at 0 until the circular buffer is full, in which case the offset increments as main frames are overwritten. If the circular buffer becomes full again, the offset resets to 0. When an impacted frame is identified, the logical addresses and lengths of the main frames in the circular buffer 402 are added to the logical address table 305 in the partition 121 of the NVM 110, starting from the main frame at the current offset.

If no main frames or impacted frames are determined at block 510, or after the storage device stores the logical addresses and lengths of these main frames or impacted frames in the subset of video frames at block 512, the host device determines whether to perform rapid playback at block 514. If the host device determines not to perform rapid playback, then at block 516, the host device may read the plurality of video frames from the storage device. For example, referring to FIG. 1, the processor 101 of the host device 104 may send a read command to the controller 123 of the storage device 102 to read the plurality of video frames 119 from the NVM 110 in 1×, 2×, 4×, 8×, 16×, 32×, or other playback speed.

Alternatively, if the host device determines to perform rapid playback at block 514, then at block 518, the host device reads the logical addresses and lengths in the subset of video frames. For example, referring to FIGS. 1 and 3, the host device 104 may send a read command to the storage device 102 to read the partition 121 in which the logical addresses and lengths of the subset of video frames are stored. The storage device 102 may provide the host device 104 the logical address of the partition to be read during initialization of the storage device 102. After the host device 104 receives the logical addresses and lengths of the subset of video frames (e.g. the logical address table 305), at block 520, the host device reads the subset of video frames from the storage device. For example, referring to FIGS. 1-3, the host device 104 may send a read command to the storage device 102 to read the video frames 119 associated with the logical addresses in the L2P mapping table 205 corresponding to the logical addresses read from the logical address table 305. In response, the storage device 102 provides the host device 104 the subset of video frames.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
non-volatile memory configured to store a plurality of video frames received from a host device, each of the video frames being associated with a logical address;
volatile memory configured to store the logical address of one or more of the plurality of video frames; and
a controller configured to:
store, in a partition of the non-volatile memory, the logical addresses for a subset of the video frames; and
provide the host device with access to the partition of the non-volatile memory to read one or more of the logical addresses stored in the partition during rapid playback of the plurality of video frames.

2. The storage device of claim 1, wherein the subset of the video frames are accessed from the partition in response to a read command from the host device for the rapid playback.

3. The storage device of claim 1, wherein the one or more of the logical addresses stored in the partition are updated based on erasure of corresponding video frames from the non-volatile memory.

4. The storage device of claim 1, wherein the logical addresses stored in the volatile memory are moved to the partition responsive to a video frame of the subset of the video frames being identified.

5. The storage device of claim 4, wherein the logical addresses are stored in a circular buffer in the volatile memory.

6. The storage device of claim 5, wherein an offset for the video frame in the circular buffer is stored in the partition.

7. The storage device of claim 1, wherein the controller is further configured to store a length of each video frame in the subset of video frames in the partition.

8. A storage device, comprising:
non-volatile memory configured to store each of a plurality of video frames received from a host device at one or more physical addresses of the non-volatile memory;
a controller configured to map, in a portion of the non-volatile memory, the physical address for each of the video frames with a logical address; and
volatile memory configured to store the logical address of one or more of the plurality of video frames;
wherein the controller is further configured to store the logical addresses for a subset of the video frames in a partition of the non-volatile memory separate from the portion of the non-volatile memory.

9. The storage device of claim 8, wherein the partition is a read-only partition for the host device.

10. The storage device of claim 8, further comprising a digital signal processing (DSP) chip configured to identify the subset of the video frames to be stored in the partition.

11. The storage device of claim 8, wherein the controller is further configured to store a length of each video frame in the subset of video frames in the partition.

12. The storage device of claim 8, wherein the subset of the video frames include main frames.

13. The storage device of claim 12, wherein the main frames are identified based on information received from the host device.

14. The storage device of claim 13, wherein:
the information comprises a previous frame; and
a video frame is identified as a main frame based on a comparison with the previous frame.

15. The storage device of claim 12, wherein:
the main frames are identified using at least one of artificial intelligence or a digital signal processing (DSP) chip; and
the main frames are further identified based on application-specific features.

16. The storage device of claim 8, wherein the controller is further configured to move the logical addresses stored in the volatile memory to the partition responsive to a video frame of the subset of the video frames being identified.

17. The storage device of claim 16, wherein the volatile memory is further configured to store the logical addresses in a circular buffer.

18. The storage device of claim 17, wherein the controller is further configured to store, in the partition, an offset for the video frame in the circular buffer.

19. A storage device, comprising:
non-volatile memory configured to store each of a plurality of video frames received from a host device at one or more physical addresses of the non-volatile memory;
means for mapping in a portion of the non-volatile memory the physical address for each of the video frames with a logical address;
volatile memory configured to store the logical address of one or more of the plurality of video frames;
means for storing the logical addresses for a subset of the video frames in a partition of the non-volatile memory separate from the portion of the non-volatile memory; and
means for providing the host device with access to the partition of the non-volatile memory to read one or more of the logical addresses stored in the partition during rapid playback of the plurality of video frames.

* * * * *